United States Patent Office 3,582,258
Patented June 1, 1971

3,582,258
FLAME-RETARDANT ACRYLONITRILE
POLYMERS
Denis Coleman, Stamford, Conn., assignor to American
 Cyanamid Company, Stamford, Conn.
No Drawing. Continuation-in-part of abandoned application Ser. No. 532,517, Feb. 21, 1966. This application
 July 25, 1969, Ser. No. 845,090
Int. Cl. C08f 3/78, 45/00; C08k 1/60
U.S. Cl. 8—115.5     10 Claims

ABSTRACT OF THE DISCLOSURE

Acrylic fibers having improved flame-retardancy and good luster comprising an acrylonitrile polymer combined with 2.0–15.0% of an aziridinylphosphine oxide or sulfide based on the weight of fiber. Such fibers are made by applying a solution of an aziridinylphosphine oxide or sulfide to fibers of acrylonitrile polymer while such fibers are in the gel state and thereafter heating the treated gel until the aziridinylphosphine compound has chemically combined with the polymer. The preferred aziridinylphosphine compound used is tris-aziridinylphosphine oxide.

---

This application is a continuation-in-part of application Ser. No. 532,517, filed Feb. 21, 1966, now abandoned.

This invention relates to acrylonitrile polymers having improved flame-resistance and to a process by which such polymers are prepared.

More particularly, this invention relates to fibers of acrylonitrile polymer modified to make it fire-retardant by treatment with an aziridinylphosphine oxide or sulfide; and to a process by which such modified fibers can be obtained.

It is known that improved flame resistance can be imparted to fibers of acrylonitrile polymers by various means such as by the addition of haloalkyl phosphates (e.g., in U.S. Pat. No. 3,210,315) or the incorporation of chlorine-containing polymers in conjunction with antimony oxide (U.S. Pat. No. 2,949,437). These flame-resistant products, however, have serious deficiencies such as instability to light, causing fading of the dyed material, increased tendency to soiling (which is particularly objectionable if they are to be used as floor coverings), leaching out under laundering or dyebath conditions, and impaired physical properties such as for example, reduced tensile strength and poor "hand" when they are in the form of fabrics.

An effect often associated with the addition of solid materials to the fiber is the loss of luster and this can be particularly serious when, as is usually the case, the fiber has to be subsequently crimped. The crimp in the fiber itself causes delustering, and the combined effects often make the product commercially unacceptable when bright fibers are desired. Good flame-resistance is an important factor in the commercial acceptance of any particular polyacrylonitrile fiber, but the achievement of this end without the unwanted side effects which accompany flame-retarding treatment is extremely difficult and, in fact, has not been satisfactorily achieved up until the present time.

It is, therefore, an object of the present invention to provide a flame-resisting fiber of an acrylonitrile polymer which fiber has excellent luster even after crimping, is of good "hand" when used in fabrics, has unimpaired soil resistance and tensile strength, resists leaching out during laundering and dyeing operations and, after dyeing, is both light-fast and wash-fast.

It is a more particular object of the present invention to provide an acrylonitrile polymer fiber which has been chemically modified by treatment with an aziridinylphosphine oxide or sulfide and which, by reason of the chemical modification, has improved flame-resistance.

It is a further object of the present invention to provide a process of improving the flame resistance of fibers of acrylonitrile polymer by the treatment thereof in a gel state with an aziridinylphosphine oxide or sulfide.

In accordance with the present invention, these and other objects are achieved in a surprisingly simple and effective manner. Fibers of polyacrylonitrile or a copolymer thereof while in the gel state are passed through a solution of an aziridinylphosphine oxide or sulfide, preferably tris-aziridinylphosphine oxide. The heated gel is then conditioned by heating and drying. The conditioned, treated fiber is found to have excellent flame-retardancy and is unimpaired both with respect to luster and other physical properties.

While, as indicated above, tris-aziridinylphosphine oxide is preferred for use in accordance with the present invention for treatment of fibers of acrylonitrile polymer while in the gel state, other aziridinylphosphine oxides or sulfides are also useful. Such compounds (APO) may be represented by the formula:

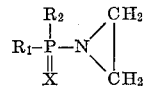

wherein X is oxygen or sulfur and $R_1$ and $R_2$ are each aziridinyl, alkoxy, aroxy, aryl, aralkyl, polyether, or the like. For simplicity, further discussion will be directed to the compounds wherein X is oxygen, it being understood that the discussion also applies to the compounds wherein X is sulfur.

These compounds may be categorized as (a) mono-aziridinylphosphine oxides or sulfides; (b) bis-aziridinylphosphine oxides or sulfides; and (c) tris-aziridinylphosphine oxide or sulfide depending on whether one, two, or three aziridinyl groups are attached to the phosphorus. In the bis-aziridinylphosphine oxides and sulfides of the above formula, $R_1$ is aziridinyl and $R_2$ may be alkoxy (such as methoxy, ethoxy, propoxy, butoxy, stearoxy, chloro-ethoxy, bromo-ethoxy, di-bromo-propoxy, and cyclohexoxy), aryl (such as phenyl, naphthyl, tolyl, xylyl, tri-bromo-phenyl, penta-chloro-phenyl, bromo-naphthyl, and tetra-bromo-phenyl), aroxy (such as phenoxy, naphthoxy, methyl-phenoxy, di-chloro-phenoxy, penta-bromo-phenoxy, and bromo-naphthoxy), aralkyl (such as benzyl and pentabromo-phenyl methyl), and polyethers (such as $CH_2(OCH_2CH_2)_nO—$ where $n$ is a large number from about 5 to 25). In the mono-aziridinylphosphine oxides and sulfides of the above formula, $R_1$ and $R_2$ may each be any of the types of substituents mentioned in the preceding sentence.

Illustrative of these compounds (and methods of preparation and intermediates for such preparation) are those described in "Organophosphorus Monomers and Polymers" by E. L. Gefter, translated by G. M. Kosolapoff, translation edited by Leon Jacolev, published 1962 by Associated Technical Services, Inc., Glen Ridge, N.J. (see especially pages 111, 123, 16, 125, 127, the fourth formula of Table 75 and the last formula of Table 76 on pages 131 and 133); Lecher et al. U.S. Pat. 2,654,738 issued Oct. 6, 1953; Kuh et al. U.S. Pat. 2,670,347 issued Feb. 23, 1954; and "Organophosphorus Compounds" by G. M. Kosolapoff published 1950 (second printing 1958) by John Wiley & Sons, Inc., New York, N.Y. (see especially pages 73–75 for additional intermediates useful in the process of the other references for producing others of these compounds).

While, as indicated above, any aziridinylphosphine oxide or sulfide can be used in the process of the present invention, certain ones have specific additional advantages to recommend them. Thus, when it is additionally desired to produce a cross-linked product, bis- or tris-aziridinylphosphine oxides or sulfides should be used. Also, for additional flame-retardancy for use either with lower amounts of these compounds or under extremely stringent conditions, the $R_1$ and $R_2$ groups of the mono- and bis-aziridinylphosphine oxides or sulfides may contain bromine or chlorine atoms. Because of relatively more ready availability and higher reaction rates, tris-aziridinylphosphine oxide is preferred.

The simplicity and effectiveness of this invention is surprising since tris-aziridinylphosphine oxide by itself, when applied to cellulose fabrics from an aqueous bath, does not improve flame-retardancy perhaps due to insufficient polymerization with the cellulose. Similarly, it has been found that the application of APO to acrylonitrile fibers that are not in the gel state is unsatisfactory. Less than 1.0% is taken up, and no improvement in flame-retardancy is obtained.

Tris-aziridinylphosphine oxide has been successfully used as a flame-retarding agent for cellulose but in such usage, it is applied so as to form a resinous condensation product with such co-reactants as tetrakis-hydroxymethyl-phosphonium chloride, thiourea, acids or glycols. However, such resinous products are useless for treating polyacrylonitrile fibers. Color formation, harsh "hand," poor adhesion, reduction in strength and loss in luster, are the very serious side effects that accompany the application of these resins to acrylonitrile fibers. For improving the flame-retardancy of acrylonitrile polymers, the polymers while still in a gel state (either wet-gel when spun from an aqueous salt solution or porous gel when spun from an organic solvent) are readily penetrated by APO, and when subsequently heated, react to give modified polymers that, surprisingly, acquire flame-retardancy while retaining unimpaired luster and other physical properties.

Although it is not intended to limit this invention by theoretical considerations, since delustering invariably occurs when resinous condensation products of tris-aziridinylphosphine oxide with other reagents are used, it is postulated that the retention of luster in the case of the present invention must be due to combination with an active group in the acrylonitrile molecule. This could be a carboxyl group because acrylonitrile polymers made by suspension techniques contain appreciable amounts, of the order of 0.3%, of carboxyl groups. It is assumed then that the polymerization of the APO is initiated thus:

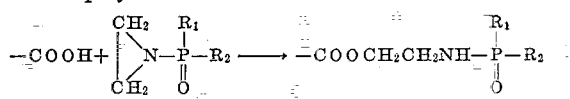

Further reaction then presumably occurs at the site of the hydrogen on the —NH group (which is continuously regenerated by each addition of monomer) and by similar attack on other aziridinyl rings. The propagation reaction is similar to that occurring in the polymerization of ethylene imine. As would be expected, the product made from tris-aziridinylphosphine oxide is cross-linked as shown by its insolubility in dimethylformamide or in aqueous sodium thiocyanate.

Thus, in practicing the present invention, an acrylonitrile polymer may be prepared in a conventional manner such as that described in U.S. Pats. 2,748,106 and 2,777,832, to give a homogeneous solution (spinning dope) containing from 5 to 35% by weight of the polymer in an inorganic or organic solvent. Organic solvents such as dimethylformamide or dimethylacetamide, tetramethylene cyclic sulfone or ethylene carbonate may be used. Water may also be a constituent, e.g. 80/20 ethylene carbonate/water. Inorganic solvents, include concentrated aqueous metal halides; thiocyanates described in U.S. Pats. 2,648,646 and 2,648,649; and concentrated nitric acid.

By "acrylonitrile polymer" is meant a polymer composition which contains an average of at least about 70% acrylonitrile in the polymer molecules. When acrylonitrile is not homopolymerized, the remainder of the polymer molecules may contain an average of up to about 30% of another ethylenically unsaturated material as is well known in the art. Illustrative of these other compounds which may be copolymerized with acrylonitrile to form polymers which can be used in the practice of the present invention are those which may be found, for example in U.S. Pat. 3,104,938, issued Sept. 24, 1963, and U.S. Pat. 3,040,008, issued June 19, 1962, and in the various other United States patents mentioned therein.

The spinning dope is extruded through a spinnerette into a coagulation bath (if wet-spun), washed free from solvent, especially if the solvent reacts with the phosphine oxide, and then preferably stretched in hot water. The stretched gel is then passed through the bath containing aqueous aziridinylphosphine oxide or sulfide, and from there into a conditioning oven heated to about 100–140° C. The heating may be conducted for one to sixty minutes, nothing being achieved by longer heating. The fiber is then relaxed by steaming or by dry heat treatment over a hot plate or heated roll, crimped and converted into staple form or alternatively processed as continuous filament. The so-treated fiber has excellent flame-resistance and shows no weight loss after repeated launderings or dry cleaning operations. Losses under dyebath conditions are negligible.

While, as before indicated, aziridinylphosphine oxide and sulfide cannot be applied to fiber or yarn because of poor penetration, it likewise should not be incorporated in spinning dopes because of its reaction with inorganic solvents, e.g., sodium thiocyanate or zinc chloride, or with the acrylonitrile polymer in those cases where the solvent is organic. Reaction with the polymer results in gelation and blocking of the spinnerettes. These difficulties are avoided by carrying out the process on the wet gel as described here.

The process of this invention will give a product that will contain combined aziridinylphosphine oxide or sulfide in amounts that vary only slightly within a narrow range. While larger amounts of aziridinylphosphine oxide or sulfide may be combined with the fiber, preferably 2–10% or up to 15% is sufficient to confer adequate flame-resistance acrylic fiber that is intended for carpet applications. When more than 15% is used, physical properties are impaired, e.g., luster. It is, of course, understood that the fiber of the present invention may also contain, in addition to APO, other flame-retardant additives.

The following examples, in which parts and percentages are on a weight basis, are intended to further illustrate the present invention. Since tris-aziridinylphosphine oxide is preferred, the following examples are all directed to the preferred embodiment of the invention using such compound. However, it is to be recognized that other aziridinylphosphine oxides and sulfides can be used as explained above.

EXAMPLE 1

Ten parts of a copolymer of acrylonitrile and methyl methacrylate (10%) prepared by suspension polymerization with a chlorate/bisulfite redox catalyst system were dissolved in ninety parts of 45% aqueous sodium thiocyanate, spun into cold 10% aqueous sodium thiocyanate, washed and subsequently stretched at 95° C. The stretched gel was then passed through a bath of 10% tris-aziridinylphosphine oxide and then conditioned at 127° C. for twenty minutes. The treated fiber was relaxed in steam, and was found to have unimpaired luster and other physical properties. On conversion into carpets, the fibers showed excellent flame retardancy when compared with other acrylic fibers. The treated fibers contained 6.0% of tris-aziridinylphosphine oxide, as shown by determination of the phosphorous content, which was not reduced by exposure to dyebath conditions or to laundering or dry-cleaning operations. The light stability of dyed fiber was unimpaired, as shown by exposing fibers dyed with cationic or disperse dyes to ultra-violet light in a Fade-Ometer, alongside untreated fibers dyed similarly.

EXAMPLE 2

This example shows that when aqueous tris-aziridinylphosphine oxide is applied to fiber rather than to wet gel, no useful effect is obtained.

Finished fiber made from the copolymer of Example 1 was immersed in 10% tris-aziridinylphosphine oxide for two hours at room temperature, removed and squeezed to 130% wet pick-up. The fiber was then heated for sixty minutes at 127° C. The treated fiber was stiff and had a poor "hand." After mock-dyeing, the phosphorous content was 0.31% corresponding to a weight increase of only 1.6%. On making up into a carpet, the fiber showed no improvement in flame-resistance.

EXAMPLE 3

A ten percent solution of a copolymer of 97% acrylonitrile and 3.0% methallyl sulfonic acid was prepared as in Example 1 from 45% sodium thiocyanate. The solution was spun and the stretched gel was treated with a 10% aqueous solution of tris-aziridinylphosphine oxide to give a combined phosphorous content of 1.5%, corresponding to a weight increase of 8.3%. This showed an even better flame-retardancy than the fiber in Example 1, and, like this, was unaffected by laundering or by drycleaning. The fiber had an equivalent luster to untreated fiber.

Examples 4, 5, 6 and 7 illustrate the delustering effect produced when tris-aziridinylphosphine oxide is applied as a resinous condensation product and deposited as a resin within the fibers.

EXAMPLE 4

The copolymer of Example 1 was treated when in the form of stretched gel with 3.0% of tris-aziridinylphosphine oxide containing 1.0% ammonium dihydrogen phosphate. After conditioning, steaming and washing, the fiber contained 4.0% of resin (phosphorus 0.76%) and was completely delustered.

EXAMPLE 5

The stretched gel of Example 1 was treated with 3.0% of tris-aziridinylphosphine oxide containing 1.0% of succinic acid to give a fiber resin that, after conditioning and steaming, was very delustered even though it contained only 2.3% of resin.

EXAMPLE 6

The stretched gel of Example 1 was treated with 5.0% of tris-aziridinylphosphine oxide mixed with 5.0% of tetrakis-hydroxymethylphosphonium chloride. After conditioning and steaming at 127° C., the extremely yellow fiber had a harsh "hand" and was very delustered. (Phosphorus content=0.85%.)

EXAMPLE 7

The stretched gel of Example 1 was treated with 5% of tris-aziridinylphosphine oxide mixed with 4.0% of thiourea, a preferred resin of prior art for cotton. After immersion in the solution for 15 minutes, the gel was removed, squeezed to 130% wet pick-up, conditioned and steamed at 127° C. The fiber was lemon-yellow, and very delustered. The phosphorus content was 0.76%, corresponding to a weight increase of about 5.0%.

I claim:

1. A process for preparing fibers of acrylonitrile polymer containing an average of at least about 70% acrylonitrile in the polymer molecules and having improved flame-retardancy and good luster qualities which comprises applying to said fibers while in the gel state a solution of an aziridinylphosphine oxide or sulfide and thereafter heating the treated gel until the aziridinylphosphine oxide or sulfide has chemically combined with the acrylonitrile polymer, whereby a flame-retardant fiber of good luster is obtained.

2. The process of claim 1, wherein said aziridinylphosphine oxide or sulfide is tris-aziridinylphosphine oxide or tris-aziridinylphosphine sulfide.

3. The process of claim 1, wherein said aziridinylphosphine oxide or sulfide is a compound of the formula:

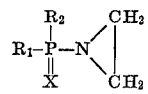

wherein X is oxygen or sulfur and $R_1$ and $R_2$ are each selected from the group consisting of aziridinyl, alkoxy, aroxy, aryl, aralkyl, and polyether.

4. The process of claim 1, wherein the heating is conducted at 100° C. to 140° C. for one to sixty minutes.

5. The process of claim 1, wherein the gel was prepared by wet-spinning an aqueous sodium thiocyanate solution of said polymer into a coagulating bath and thereafter washed substantially free of sodium thiocyanate prior to treatment with said solution of aziridinyl phosphine oxide or sulfide.

6. The process of claim 5, wherein the gel is in a stretched state prior to being contacted with the aziridinylphosphine oxide of sulfide.

7. The process of claim 1, wherein the aziridinylphosphine oxide or sulfide is combined with the wet gel to the extent of 2–15% based on the weight of polymer.

8. A fiber comprising an acrylonitrile polymer containing an average of at least about 70% acrylonitrile in the polymer molecules combined with 2.0–15.0% of an aziridinylphosphine oxide or sulfide based on the weight of fiber.

9. A fiber as defined in claim 8, wherein said aziridinylphosphine oxide or sulfide is tris-aziridinylphosphine oxide or tris-aziridinylphosphine sulfide.

10. A fiber as defined in claim 8, wherein said aziridinylphosphine oxide or sulfide is a compound of the formula:

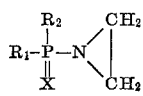

wherein X is oxygen or sulfur and $R_1$ and $R_2$ are each selected from the group consisting of aziridinyl, alkoxy, aroxy, aryl, aralkyl, and polyether.

References Cited

UNITED STATES PATENTS

| | | | |
|---|---|---|---|
| 3,034,919 | 5/1962 | Steinhauer | 117—137 |
| 3,222,118 | 12/1965 | Coleman | 8—115.5 |
| 3,409,463 | 11/1968 | Le Blanc | 117—143 |

FOREIGN PATENTS

| | | |
|---|---|---|
| 984,278 | 2/1965 | Great Britain. |

GEORGE F. LESMES, Primary Examiner

B. BETTIS, Assistant Examiner

U.S. Cl. X.R.

117—137; 260—45.8, 85.5